(12) United States Patent
Wisner et al.

(10) Patent No.: US 7,313,982 B2
(45) Date of Patent: Jan. 1, 2008

(54) MULTIPLE OUTPUT TRANSMISSION

(75) Inventors: Donald W. Wisner, Grand Haven, MI (US); Terry L. Plumert, Grand Haven, MI (US); John W. Walwood, Grand Haven, MI (US)

(73) Assignee: Track Corp., Spring Lake, MI (US)

( * ) Notice: Subject to any disclaimer, the term of this patent is extended or adjusted under 35 U.S.C. 154(b) by 305 days.

(21) Appl. No.: 10/891,379

(22) Filed: Jul. 14, 2004

(65) Prior Publication Data

US 2006/0011005 A1  Jan. 19, 2006

(51) Int. Cl.
*F16H 37/06* (2006.01)
*F16D 27/12* (2006.01)
*F16D 27/102* (2006.01)
*F16D 15/00* (2006.01)

(52) U.S. Cl. ............... 74/664; 74/665 G; 192/48.2; 192/84.8; 192/93 C; 192/71; 192/38

(58) Field of Classification Search ............ 74/665 F, 74/665 G, 665 GA, 664; 192/93 C, 84.8
See application file for complete search history.

(56) References Cited

U.S. PATENT DOCUMENTS

| | | | | |
|---|---|---|---|---|
| 750,370 | A * | 1/1904 | Kammerer | 192/84.21 |
| 3,406,795 | A * | 10/1968 | Pickles | 477/12 |
| 4,860,866 | A * | 8/1989 | Stanek | 192/71 |
| 4,964,503 | A * | 10/1990 | Nishiyama et al. | 192/12 D |
| 5,092,197 | A | 3/1992 | Hauger | |
| 5,138,211 | A * | 8/1992 | Haefner et al. | 310/78 |
| 5,427,345 | A | 6/1995 | Yamakami et al. | |
| 5,570,608 | A * | 11/1996 | Miller | 74/325 |
| 5,694,812 | A | 12/1997 | Maue et al. | |
| 5,764,010 | A | 6/1998 | Maue et al. | |
| 6,126,132 | A | 10/2000 | Maue | |
| 6,412,223 | B1 | 7/2002 | Hiebl | |
| 6,675,667 | B1 * | 1/2004 | Pelletier et al. | 74/333 |

FOREIGN PATENT DOCUMENTS

GB  2153218  8/1985

(Continued)

OTHER PUBLICATIONS

Image of Seat Adjuster Transmission, front view (prior art).

(Continued)

*Primary Examiner*—Richard M. Lorence
*Assistant Examiner*—Edwin A Young
(74) *Attorney, Agent, or Firm*—Warner Norcross & Judd LLP

(57) ABSTRACT

A transmission for driving one or more powered devices from a single drive motor. The transmission includes at least one output drive shaft, and at least one gear. Each gear is in constant driving engagement with at least one other gear, and one gear is engaged with the motor. Each of the output shafts is adapted to be coupled to at least one of the devices and at least one of the gears. The transmission also includes a plurality of clutches. Each of the clutches is uniquely associated with one of the output drive shafts and one of the gears, and each of the clutches selectively couples a gear to a corresponding output drive shaft. The transmission may include a control system for activating the motor and the clutches at desired time intervals.

10 Claims, 8 Drawing Sheets

FOREIGN PATENT DOCUMENTS

| | | |
|---|---|---|
| WO | WO 02/20302 | 3/2002 |
| WO | WO 03/146321 | 6/2003 |

OTHER PUBLICATIONS

Image of Seat Adjuster Transmission, exploded view (prior art).
Image of Seat Adjuster Transmission, top view (prior art).
Image of Seat Adjuster Transmission, front view (prior art).
Image of Seat Adjuster Transmission, clutch (prior art).
Image of Seat Adjuster Transmission, clutches (prior art).
Image of Seat Adjuster Transmission, clutch (prior art).
Image of Seat Adjuster Transmission, gear (prior art).
Image of Flexible Drive Cables (prior art).
Image of Seat Adjuster (prior art).
Image of Seat Adjuster Transmission, housing (prior art).

* cited by examiner

MULTIPLE OUTPUT TRANSMISSION

BACKGROUND OF THE INVENTION

The present invention relates to transmissions for motors, and more particularly to a transmission that selectively couples a motor with one or more powered devices.

It is well known in a wide variety of applications to couple a motor with a powered device for driving the powered device. For example, motors are often used in seating applications to provide seats and seat backs with a variety of powered adjustments, such as seat depth, seat angle and a recline for the seat back. As another example, motors are also commonly used to drive powered mirrors, powered windows and powered door locks, such as in automobiles. A switch or multiple switches are generally accessible to the user to allow users to actuate the motor and operate the particular device.

In most of these applications, it is common to provide one motor for each corresponding powered device. For instance, a seat providing powered adjustment for the seat depth, seat angle and seat back recline would generally have three separate motors, one for each application. Each motor actuates a single drive shaft that extends from the motor to a corresponding powered device. As each individual motor is actuated with its corresponding switch, the drive shaft for that motor actuates a particular powered device.

A problem with the use of a separate motor for each device is that each motor adds additional cost and additional weight. In addition, the use of separate motors can become cumbersome as more features are added to a particular application. In many cases it is desirable to keep the motors out of sight, which often means they are placed in tight, out of the way locations. In seating applications, for example, the motors are generally placed under the seat and within the seat frame. The space required for each separate motor makes it difficult to add new features to the seat, including additional powered devices.

SUMMARY OF THE INVENTION

The aforementioned problems are overcome by the present invention wherein a motor transmission is provided that drives one or multiple outputs from a single motor.

In one embodiment, the present invention includes an input that is in constant engagement with the motor, and a plurality of output shafts that are each adapted to attach to a powered device. The input is selectively coupled to each of the output shafts so that a user can selectively engage a particular output shaft and actuate its corresponding powered device.

In another embodiment, the present invention includes a chain of gears for coupling the input to the output shafts. The chain of gears includes a drive gear in driving engagement with the motor, and a plurality of output gears in constant engagement with the drive gear. The output gears are each selectively coupled to one of the output shafts and its corresponding powered device. When a user wants to operate a particular powered device, the corresponding output shaft is engaged with an output gear, and therefore indirectly engaged with the drive gear and in driving engagement with the motor.

In another embodiment, the present invention may include a plurality of clutches for selectively coupling the output shafts to the respective drive gears. One clutch is uniquely associated with each of the output gears and output shafts. Each clutch includes a bearing assembly inside one of the output gears. The bearing assembly includes a plurality of bearings disposed inside a section of the output shaft, a plurality of corresponding bearing holes in the output shaft, and a plurality of ridges in an internal surface of the output gear. In operation the bearings can be moved outwardly to engage both the bearing holes in the drive shaft and the ridges in the output gear—consequently coupling the drive shaft and the output gear. Each clutch may additionally include a plunger that is movable to engage and move the bearings. The plunger may be selectively operated by a conventional solenoid.

The present invention provides a motor transmission that drives multiple powered devices from a single motor. This reduces the unwanted weight and extra cost associated with using separate motors for each powered device, and also reduces the space required to drive multiple powered devices.

These and other objects, advantages, and features of the invention will be more fully understood and appreciated by reference to the detailed description of the current embodiments and the drawings.

DETAILED DESCRIPTION OF THE CURRENT EMBODIMENT

Figure 1:
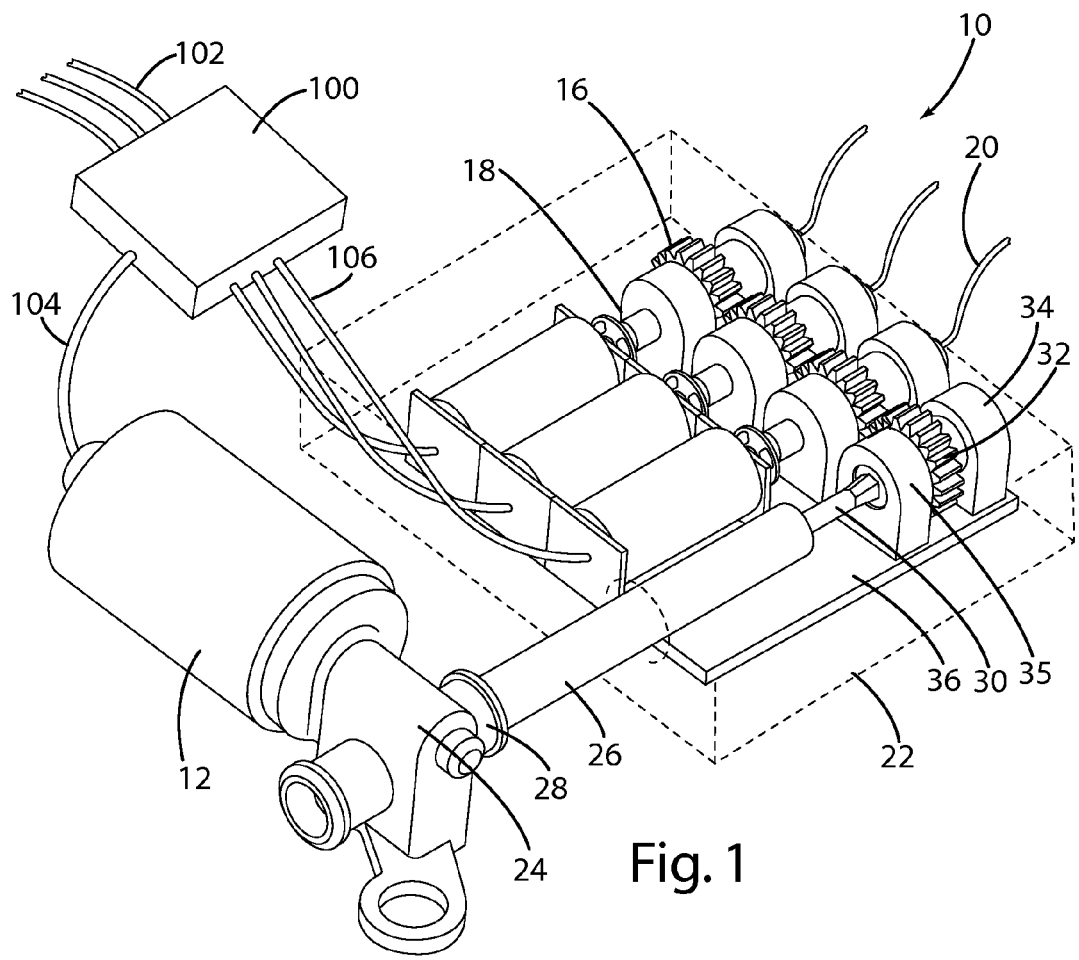
FIG. 1 is a perspective view of the transmission according to one embodiment of the present invention.
Figure 2:
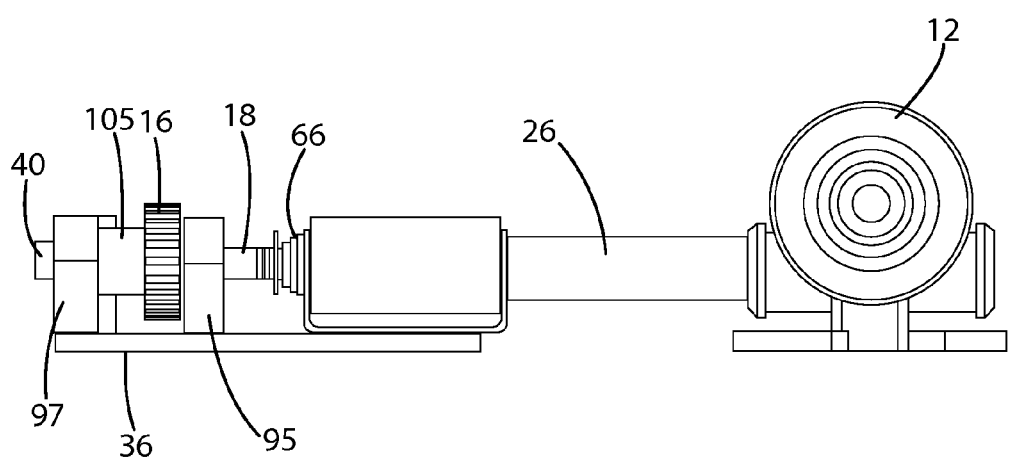
FIG. 2 is a front view of the transmission.
Figure 3:
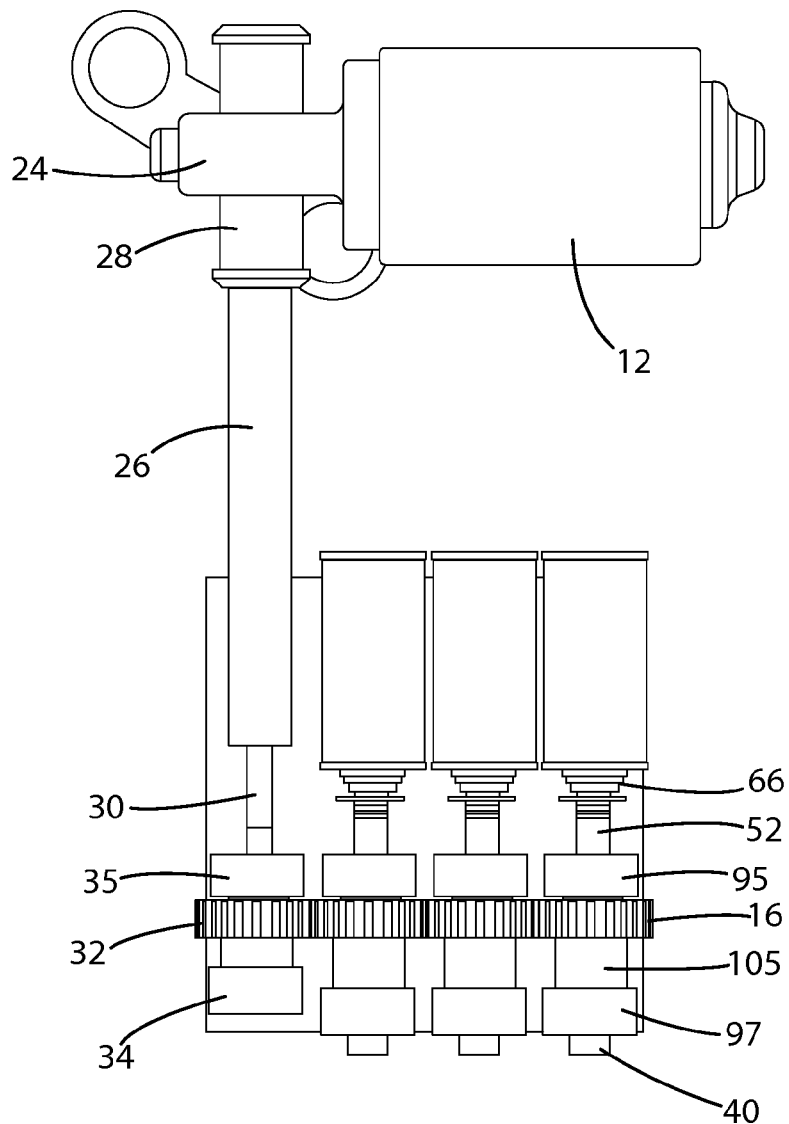
FIG. 3 is a top view of the transmission.
Figure 4:
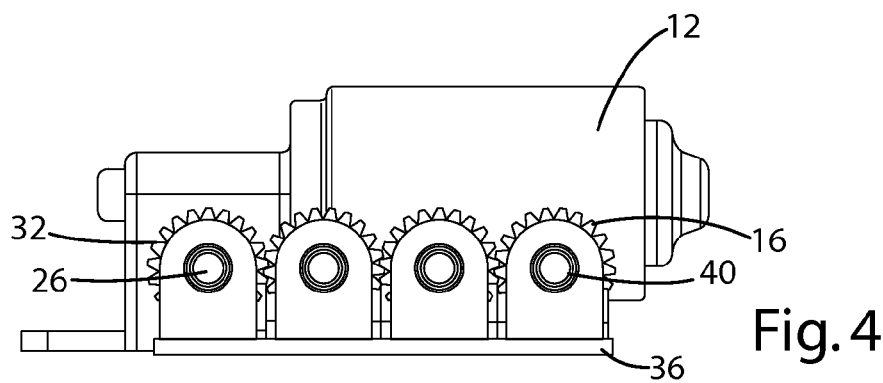
FIG. 4 is a side view of the transmission.

A multiple output transmission according to one embodiment of the present invention is shown in FIG. 1 and is generally designated 10. The transmission 10 includes a motor 12, and a plurality of output shafts 14 selectively coupled to the motor 12. The output shafts 14 may be coupled to the motor 12 with a chain of gears 16, and a plurality of clutches 18. Each output shaft 14 is connected to a flex cable 20 or other conventional drive shaft for driving a variety of different power actuated accessories.

I. Structure

As shown in broken lines in FIG. 1, at least a portion of the transmission 10 may be mounted in a housing 22. The housing 22 in FIG. 1 is merely exemplary, and in this case is rectangular and encloses the clutches 18 and output shafts 14. Alternatively, the housing 22 could have any desired shape or size and incorporate a number of features such as support blocks 34, 35, 95, and 97 for supporting the clutches 18, output shafts 14, drive shaft depending on the desired application. The clutches 18 and output shafts 14 may be attached to a separate support plate 36 that is mounted within the housing 22. The motor 12 is generally conventional, and therefore will not be described in great detail. As shown, the motor 12 includes a 90-degree gear box 24, and a drive shaft 26 extending from the gear box 24. A variety of different gear boxes could be used, or alternatively no gear box at all. The drive shaft 26 includes a first end 28 attached to the gear box 24, and a second end 30 that extends into the housing 22 and attaches to a drive gear 32. The second end 30 of the drive shaft 26 and the drive gear 32 may be supported by a pair of support blocks 34, 35 that are mounted to the housing 22 or to the separate support plate 36.

Figure 5:
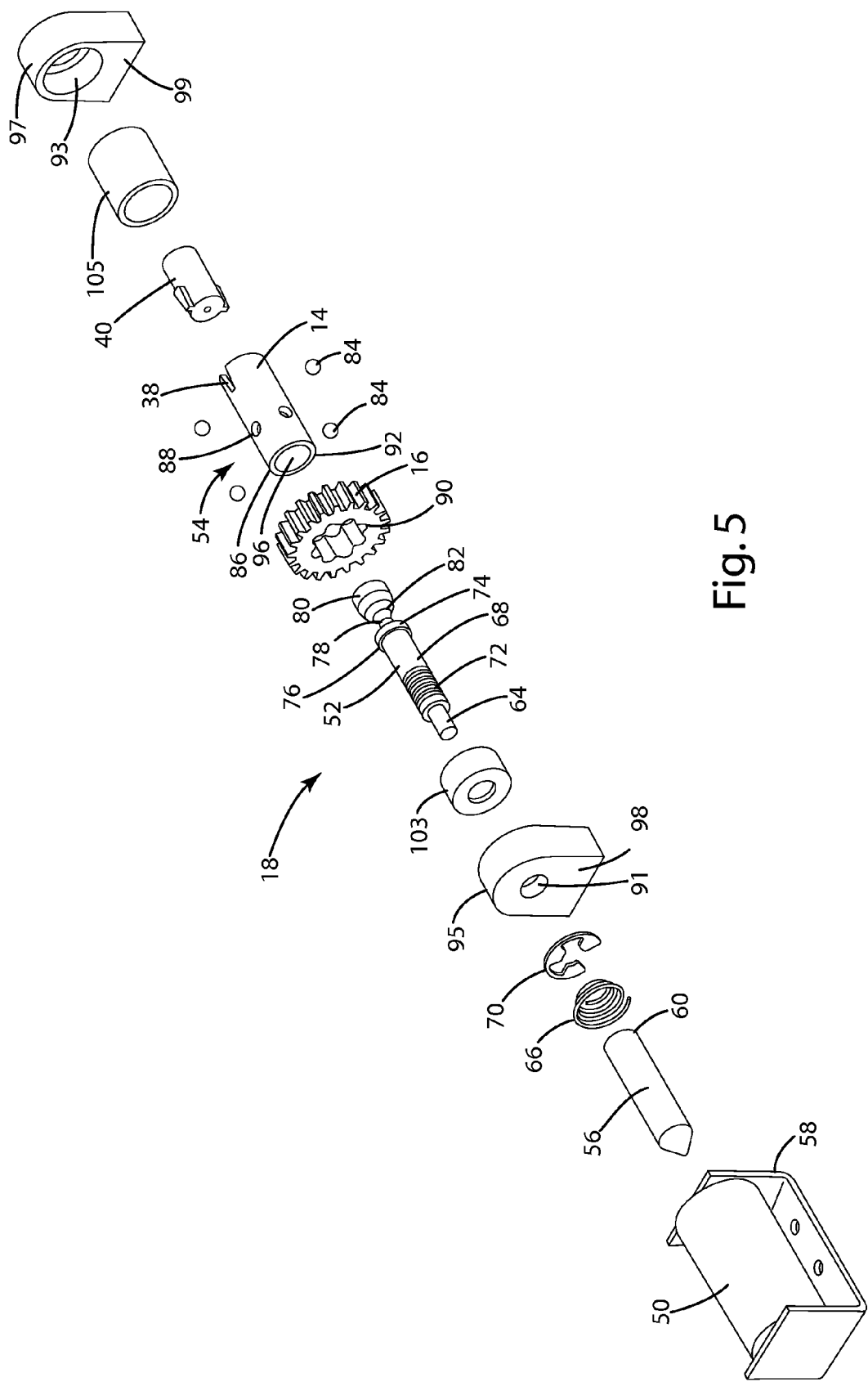
FIG. 5 is an exploded view of a clutch according to one embodiment of the present invention.

The drive gear 32 is generally in constant engagement with a chain of output gears 16, such that the drive gear 32 and each of the output gears 16 are driven when the motor 12 is actuated. As shown, the gears 32 and 16 are standard spur gears of similar ratios, however, a wide variety of gears may be used depending on the desired output. Alternatively, the gears may be replaced by other known drives in engagement with the motor 12. The output gears 16 may be selectively engaged with a plurality of output shafts 14. In one embodiment, each of the output gears 16 is uniquely associated with one of the output shafts 14, so that the output shaft 14 is driven by its corresponding output gear 16 when it is selectively engaged with that output gear 16. As shown in FIG. 5, the output shafts 14 are cylindrical, and include a pair of opposing notches 38 for receiving an adapter 40 on the end of a conventional flex cable 20. Flex cables 20 generally include an outer sheath that surrounds an inner cable. The inner cable can rotate within the outer sheath. The adapters 40 on the flex cable 20 are attached to the inner cable, so that rotation on one adapter 40 provides the same rotation at the other end of the cable 20. Alternatively, the flex cables 20 could be replaced with a variety of well known drive shafts. As described in more detail below, when an output shaft 14 is engaged with its corresponding output gear 16, the output shaft 14 is rotationally driven, which in turn rotates the flex cable 20 and any accessory attached to the flex cable.

Figure 6:
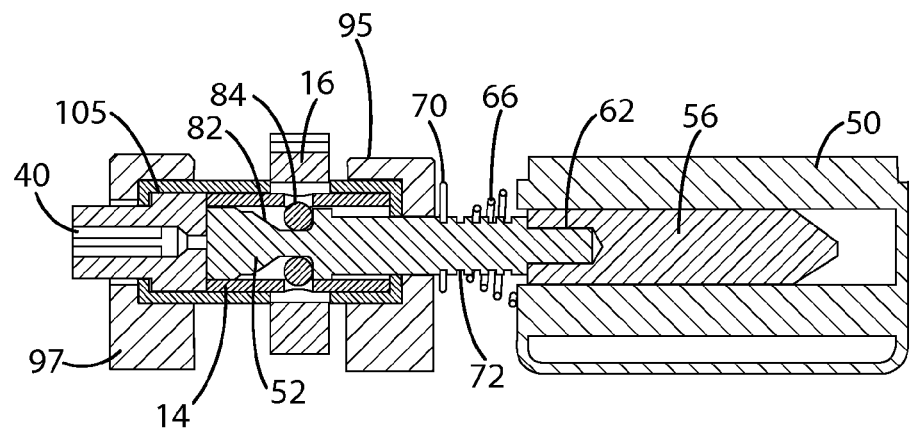
FIG. 6 is a sectional view of a clutch in a disengaged position.
Figure 7:
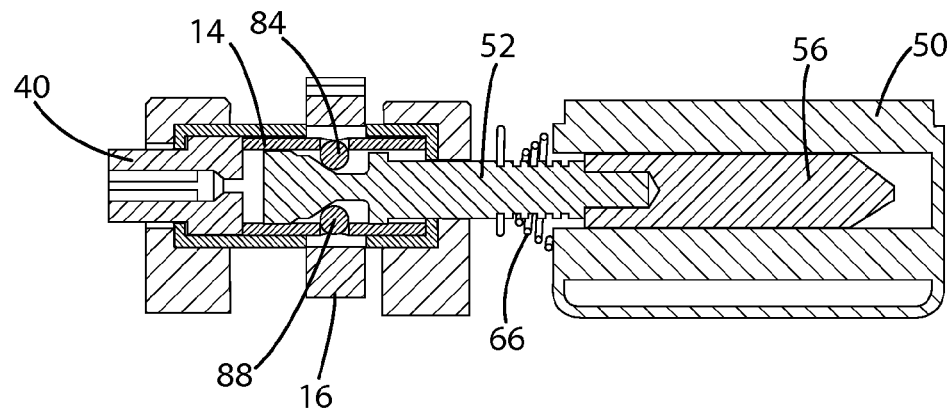
FIG. 7 is a sectional view of a clutch in a partially engaged position.
Figure 8:
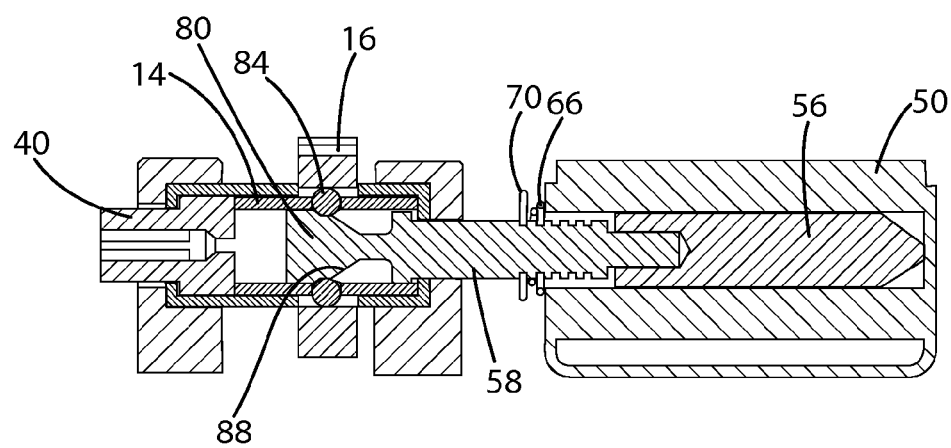
FIG. 8 is a sectional view of a clutch in an engaged position.

In one embodiment, a plurality of clutches 18 operate to selectively engage the output gears 16 with the output shafts 14. Referring now to FIG. 5, the clutches 18 may each include a solenoid 50, a plunger 52, and a bearing assembly 54. Solenoids 50 are generally conventional, and therefore will not be described in great detail. Suffice it to say that a rod 56 is disposed within a coil 58 such that the rod 56 can translate linearly with respect to the coil 58. When the solenoid 50 is actuated, a current passes through the coil 58, creating a magnetic field that moves the rod 56 by pulling it into the coil 58 from the disengaged position shown in FIG. 6, through the position shown in FIG. 7, and into the engaged position shown in FIG. 8. The rod 56 includes an end 60 that is attached to the plunger 52. As shown, the end 60 of the rod 56 includes a slot 62 that receives a portion 64 of the plunger 52. This portion 64 of the plunger 52 is attached in the slot 62 by a known method, such as a friction fit, mechanical fastening system, or an adhesive. As shown, the rod 56 is biased in the disengaged position with a spring 66. The spring 66 fits around the shaft 68 of the plunger 52, and is held in place on the shaft 68 by a snap ring 70. The snap ring 70 interfits with the shaft 68 of the plunger 52 by snap-fitting into one of a plurality of annular grooves 72 defined in the shaft 68 of the plunger 52. The snap ring 70 can be placed in any one of the grooves 72, depending on the size of the spring 66 that is used. In another embodiment, a two-way solenoid may be used to move the rod 56 and plunger 52 between the engaged and disengaged positions. As mentioned, the plunger 52 is attached to the rod 56 and includes a portion 64 extending into the rod 56, and a shaft 68 extending from the portion 64. The shaft 68 is generally an elongated cylinder having a collar 74 extending radially outwardly at an end 76 opposite the portion 64. The plunger 52 further includes a neck 78 extending from the end 76. The neck 78 is also cylindrical, but narrower than the shaft 68. The neck 78 graduates into a head 80 through a frustoconical transition portion 82.

The bearing assembly 54 includes the neck 78 and head 80 of the plunger, a plurality of bearings 84, a portion 86 of the output shaft 14 including a plurality of bearing holes 88, and one or more internal grooves 90 on the output gear 16. As shown, the assembly includes four bearings 84, and four bearing holes 88. The bearing holes 88 are circumferentially spaced around the output shaft near an end 92 of the output shaft 14 opposite the notches 38. The bearing holes 88 are generally sized such that they have a diameter slightly larger than the diameter of the bearings 84, so that a portion of a bearing 84 can extend through a bearing hole, and into one or more internal grooves 90 on the output gear 16. The internal grooves 90 of the output gear 16 are rounded into approximately the same shape as the exterior of the bearings 84, and are also circumferentially spaced around the inside of the gear 16. This aids not only in providing a smooth engagement, but naturally aids in disengaging the bearings 84 when the plunger 52 returns to the disengaged position. The plunger 52, output shaft 14, and output gear 16 are assembled such that the head 80, neck 78, and a portion of the shaft 68 of the plunger 52 fit inside the output shaft 14 through the end 92 of the output shaft 14. The collar 74 forms a close fit with the inner surface 96 of the output shaft 14, but allows the plunger 52 to translate linearly within the output shaft 14. The bearings 84 are trapped inside the output shaft 14, between the neck 78 of the plunger 52 and the inner surface 96 of the output shaft 14. The output shaft 14 is positioned inside the output gear 16 with the bearing holes 88 in the output shaft 14 aligned with the internal grooves 90 of the output gear 16. When the solenoid 50 is in a disengaged position (FIG. 6), the neck 78 of the plunger 52 is aligned with the bearing holes 88 of the output shaft 14 so that the bearings 84 fit inside the output shaft 14 and are held in position by the holes 88. When the solenoid is in an engaged position (FIG. 8), the plunger 52 is pulled partially out of the output shaft 14, forcing the bearings 84 to ride up the frustoconical portion 82 of the plunger and extend through the bearing holes 88 and into the internal grooves 90 of the output gear 16. In this engaged position, the bearings interconnect the output gear 16 and the output shaft 14 such that rotation of the gear 16 causes rotation of the shaft 14. The clutches 18 may each be supported on the support plate 36 by a pair of support blocks 95, 97. The support blocks 95, 97 are attached to the support plate 36, and include an outer surface 98, and an inner surface 99. The support blocks define openings 91, 93 extending through the inner 98 and outer 99 surfaces respectively. The openings 91, 93 may be larger on the inner surfaces 99 to receive spacers 103, 105. The spacers 103, 105 fit partially into the openings 91, 91, and are located on either side of the output gear 16 to hold the output gear 16 in place. The shaft 68 of the plunger 52 extends through the spacer 103, through opening 91 and support block 95, and into the output shaft 14. The outer surface of the support block 95 is located near the solenoid 50. The output shaft 14 extends into the opening 93 on the second support block 97, and is held in place by the spacer 105. The adapter 40 of the flex cable 20, which is connected to the output shaft 14, extends through the outer surface 98 of the second support block 97. The clutches 18 disclosed and illustrated are particularly useful in coupling the output shaft 14 with an output gear 16, however, a variety of other known coupling methods may alternatively be used.

Figure 12:
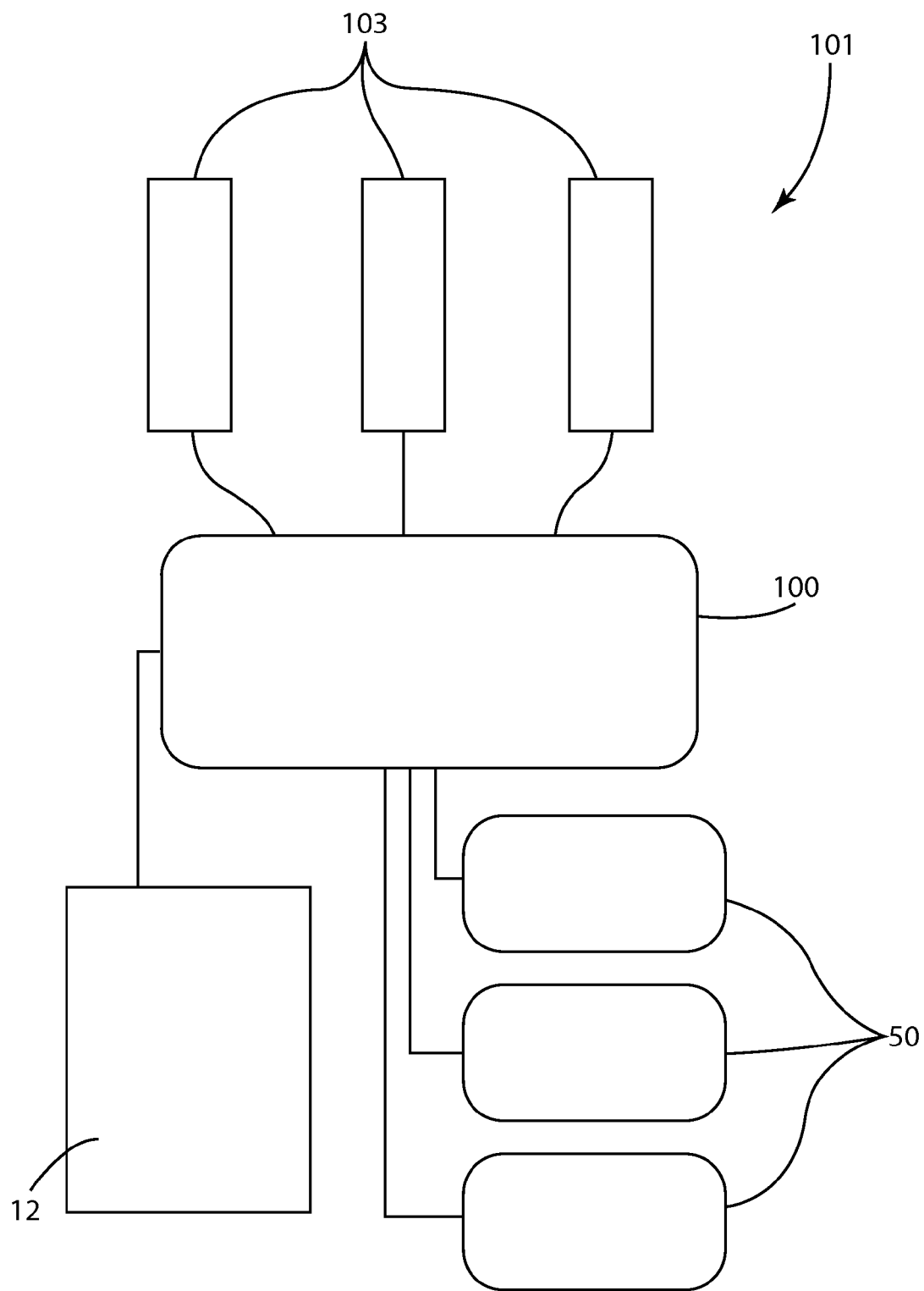
FIG. 12 is a schematic of the control system of the present invention.

As shown in FIGS. 1-4, the transmission includes three output gears 16 and three corresponding selectively operable output shafts 14 connected to three flex cables 20. As described below, each of the flex cables 20 conventionally attaches to a desired powered accessory. Although the transmission is illustrated with three selectively operable output shafts 14, it may have more or less output shafts as desired—depending on the number of power operated accessories to be used. Each accessory is generally actuated by a control system 101 shown in the FIG. 12 schematic. The control system 101 includes a plurality of switches 103, and a may include a controller 100. Each switch 103 is connected to the controller 100 with conventional cables 102. Actuation of a switch 103, such as by depression of the switch 103, sends a signal to the controller 100. The controller 100 is connected to the motor 12 with one or more cables 104, and to each solenoid 50, also with conventional wiring 106 so the controller 100 can actuate the motor 12 and appropriate solenoids 50 in response to signals received from the switches 103. Each solenoid, and consequently each accessory, is generally associated with one corresponding switch. Although the illustrated embodiment includes a control system 100, conventional analog circuitry can alternatively be used to directly drive the motor 12 and appropriate solenoids 50.

Figure 9:
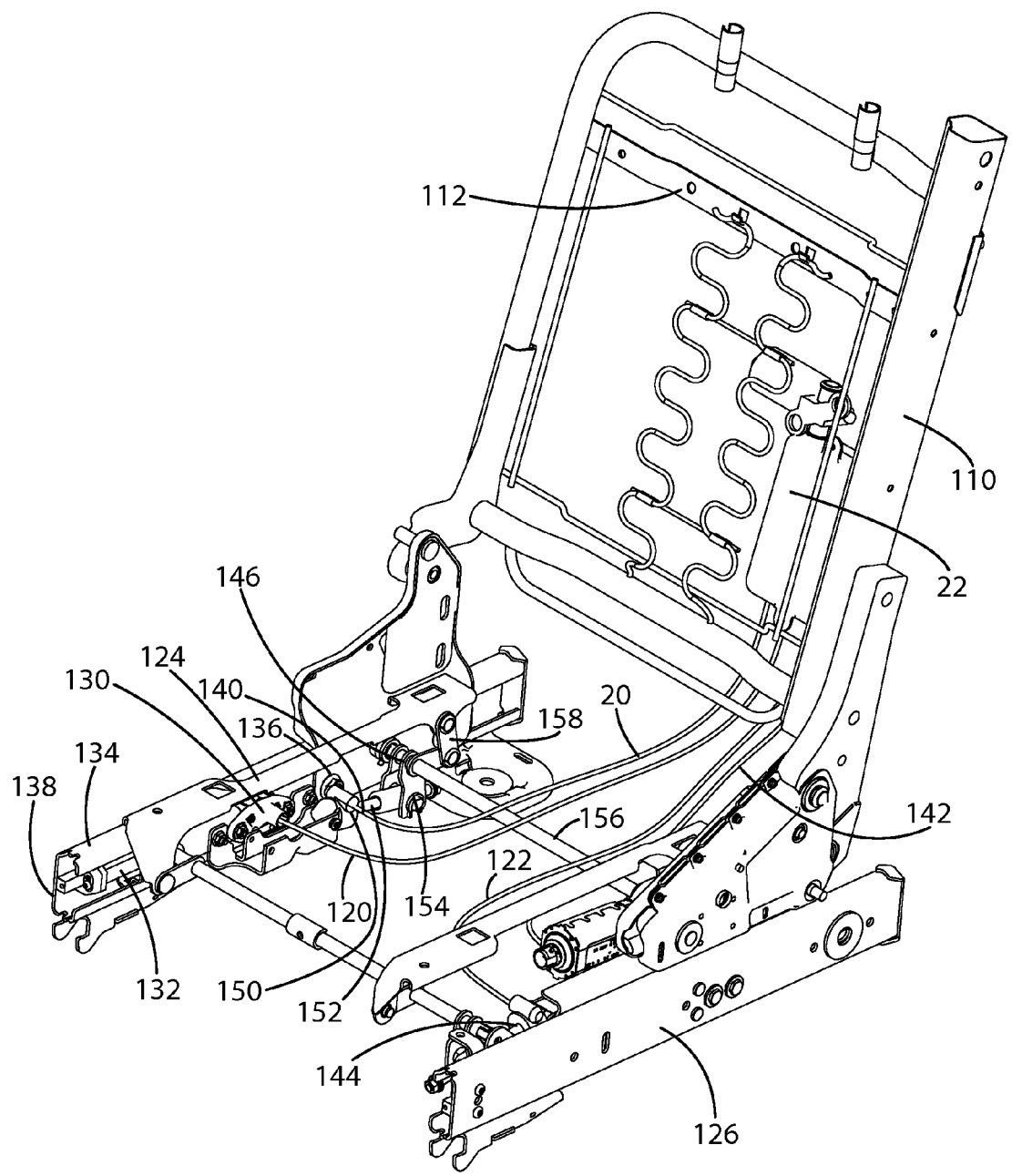
FIG. 9 is a perspective view of the transmission installed in a power actuated seat.
Figure 10:
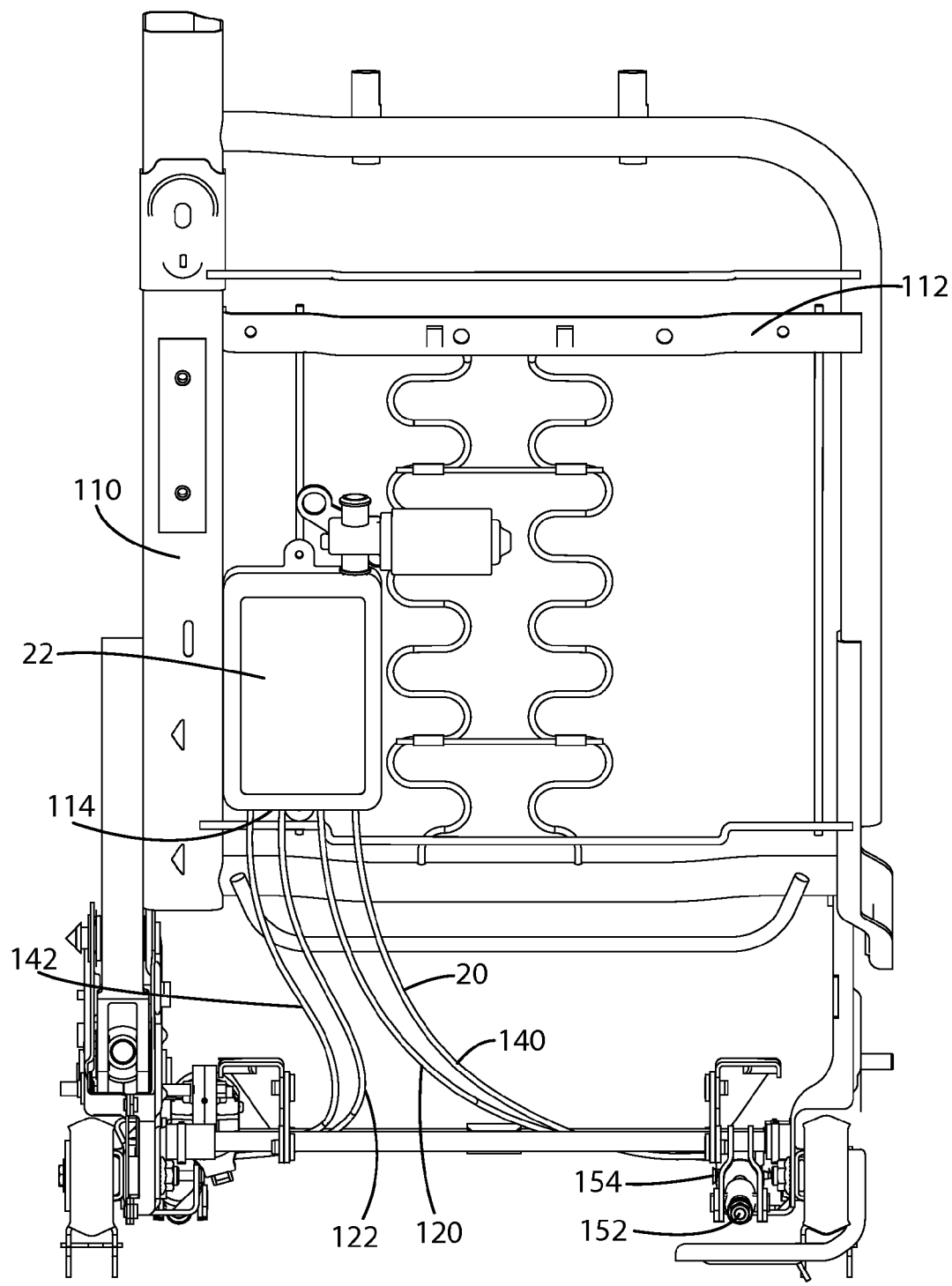
FIG. 10 is a rear view of the transmission installed in a power actuated seat.

FIGS. 9 and 10 illustrate one embodiment of the present invention, wherein the transmission 10 is installed in a power actuated chair. The power actuated chair is exemplary of a power automotive seat, allowing a user to adjust the forward and rearward depth of the seat, and the angle of a front portion of the seat and a rear portion of the seat. FIGS. 9 and 10 show the frame and the mechanical parts of the power actuated chair. As shown, the housing 22 is mounted to one of the posts 110 for the back rest 112 of the chair with the motor 12 positioned above the housing 22. The flex cables 20 extend from the output shafts 14 and through the lower edge 114 of the housing 22. A first pair of flex cables 120, 122 run from the housing 22 to opposite sides 124, 126 of the lower seat frame for controlling the depth of the seat. The flex cables 120, 122 each extend into a gear assembly 130 that is engaged with a threaded rod 132 and telescoping rails 134. When the flex cables 120, 122 are actuated, they drive the gear assembly 130, which in turn drives the threaded rod 132 and telescopes an inner rail 136 within a stationary outer rail 138. The seat (not shown) attaches to the inner rail 136 and moves with the inner rail 136. A second pair of flex cables 140, 142 run from the housing to a front angle adjustment mechanism 144 and a rear angle adjustment mechanism 146. The angle adjustment mechanisms 144, 146 may each include a gear assembly 150, a threaded rod 152, a clevis 154, and axle, 156 and a crank 158. The gear assemblies 150, or alternatively the flex cables 140, 142 directly, each engage a threaded rod 152, which is connected to a clevis 154 and can travel relative to the clevis 154. The clevis 154 is fixedly mounted to the axle 156, which is fixedly mounted to the crank 158. When the threaded rod 152 travels relative to the clevis 154, the axle 156 rotates and the crank 158 pushes that portion of the seat upward. Of course, this is merely an exemplary description of a power actuated seat. The present invention in fact may be used in connection with a wide variety of known power actuated seats.

II. Operation

In operation, actuation of a switch corresponding to a particular powered accessory, for instance, the front seat angle adjustment 144, causes the clutch 18 corresponding to that accessory to engage the output gear 16, and output shaft 14 and consequently drive the flex cable 140 attached to that accessory.

More specifically, actuation of the switch, for instance, by depressing the switch, sends a signal to the controller 100. The controller 100 interprets the signal and actuates the motor 12 in a direction corresponding to the direction of the actuation of the switch. The controller 100 also sends a signal to the corresponding solenoid 50, which actuates the solenoid 50 by energizing the coil 58. The actuation of the solenoid 50 by the controller 100 may be slightly delayed after the actuation of the motor 12 to allow the output gears to engage properly. Actuation of the motor 12 initiates rotation of the drive shaft 26, and consequently the rotation of the drive gear 32. Since the output gears 16 are in constant driving engagement with the drive gear 32, the output gears 16 are driven to rotate by the rotation of the drive shaft 26 and the drive gear 32. Actuation of the solenoid 50 operates to engage the desired one of the output shafts 14 with a corresponding output gear 16. When the solenoid 50 is energized, the rod 56 is drawn into the solenoid 50. The plunger 52, being attached to the rod 56, is therefore also drawn from the disengaged to the engaged position (shown in FIGS. 6-8). Movement of the plunger 52 forces the bearings 84 to ride up the frustoconical portion 82 of the plunger 52 so that a portion of the bearings 84 extends through the bearing holes 88 and engages the internal groove 90 of the corresponding output gear 16. This causes the output shaft 14 to rotate with the output gear 16, and consequently rotate the adapter 40 and the flex cable 20. In this example, since the switch corresponding to the front seat angle adjuster 144 was depressed, the flex cable 20 attached to the adjuster 144 rotates to drive the threaded rod 152, rotating the axle 156, raising the crank 158, and pushing the front portion of the seat in the desired vertical direction. Any other output shaft 14 and attached accessory can be actuated in a similar manner. The switch for that accessory is depressed, the motor 12 is actuated, and the solenoid 50 charges to engage the output shaft 14 for that accessory. After the operation of the accessory is complete, the switch is deactivated. This causes the controller 100 to deenergize the solenoid 50 and deactivate the motor 12. The controller 100 may delay the deactivation of the motor 12 until some time after the solenoid 50 is deenergized to ensure proper and full disengagement.

III. Second Embodiment

Figure 11:
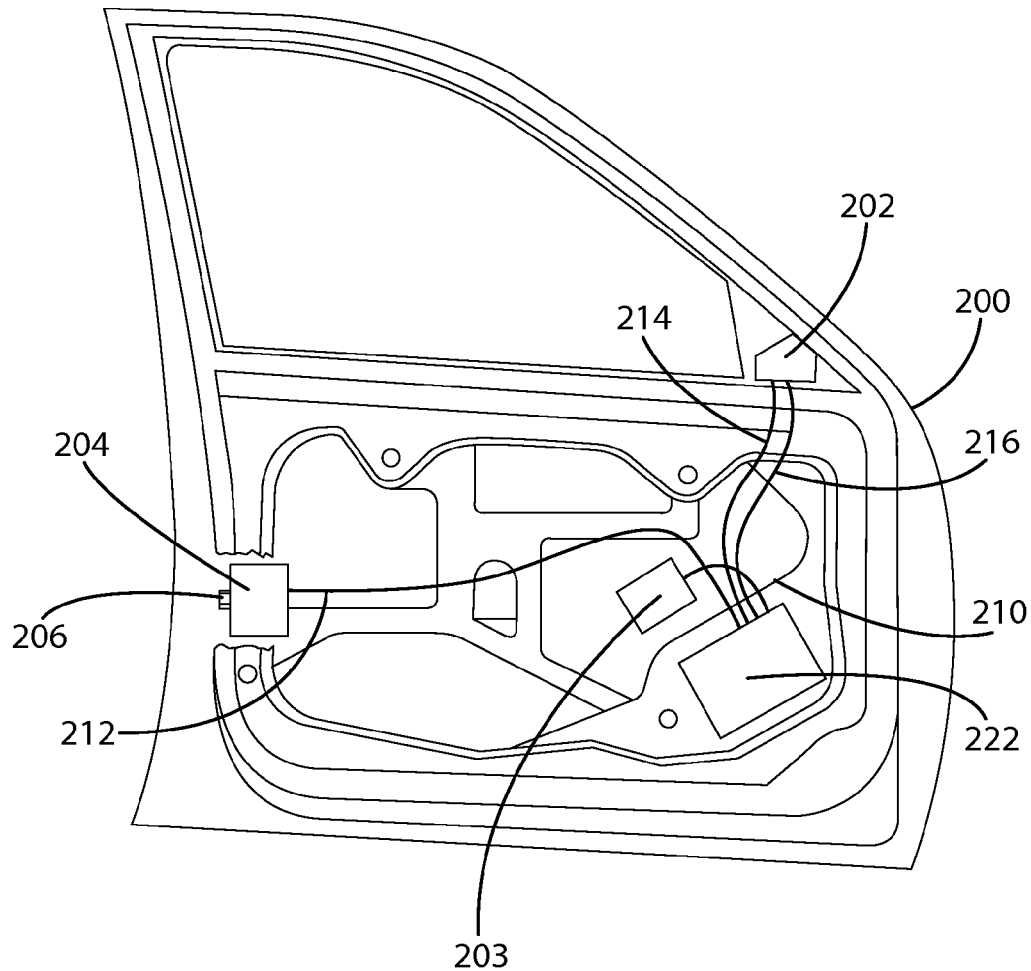
FIG. 11 is a side view of the transmission installed in a vehicle door.

FIG. 11 shows a second embodiment of the present invention, wherein the transmission is mounted within a vehicle door 200 for operation of various powered accessories in the door 200. As shown, the transmission is attached to a power adjustable mirror assembly 202, a power window assembly 203, and a power lock assembly 204 via flex cables similar to those used in the seat application.

In this embodiment, the housing 222 is mounted inside the door 200 near the front of the door 200. Of course, the housing 222 could be mounted anywhere in the door where there is sufficient space. Unlike the housing 22 of the first embodiment, the housing 222 of this embodiment encloses motor as well as the clutches and output shafts. The housing 222 can be mounted to the door 200 by any conventional method, such as a nut and bolt. Four flex cables 210, 212, 214, and 216 extend from the housing 222 to the three powered accessories.

The first flex cable 210 extends from the housing 222 to actuate a power window assembly 203. Power window assemblies are well known, and generally include a gear, such as a worm gear, that rotates and engages a lever either directly or through a series of gears. The lever is connected to the window to raise and lower the window through any one of a number of well known lift mechanisms. The flex cable 210 may be attached to the worm gear or another gear to actuate the power window assembly.

The second flex cable 212 extends from the housing 222 to a power door lock assembly. These assemblies are also conventional, and may include a series of rotating gears and a rack and pinion for transferring the rotation into linear motion in order to move a catch 206 back and forth for locking the door 200. The flex cable 212 may attach to one of the rotating gears to actuate the door lock.

The third and fourth flex cables 214 and 216 extend from the housing to a power mirror assembly. Mirror assemblies, like the window and lock assemblies, are generally conventional and may include a first gear assembly for actuating horizontal motion of the mirror and a second gear assembly for actuating vertical motion. The gear assemblies may each include a worm gear attached to the flex cables 214 and 216 that engages another gear or series of gears connected to the mirror.

As in the first embodiment, any of the accessories can be actuated at any given time by depressing a switch corresponding to that particular accessory, which drives and the motor and engages the output shaft and output gear for that accessory.

The above descriptions are those of current embodiments of the invention. Various alterations and changes can be made without departing from the spirit and broader aspects of the invention, which are to be interpreted in accordance with the principles of patent law including the Doctrine of Equivalents.

The embodiment of the invention in which an exclusive property or privilege is claimed are defined as follows:

1. A transmission for driving multiple powered devices from a single drive motor comprising:
   a plurality of output drive shafts, each of said drive shafts adapted to be coupled to at least one of the devices, each said output drive shaft defining a bearing hole;
   a plurality of output gears affanged in a serial affangement, each of said output gears in constant operative engagement with at least one adjacent output gear, one of said output gears in constant operative engagement with the motor, whereby operation of the motor is transmitted to each of said output gears from an adjacent said output gear by virtue of said serial arrangement, each of said output gears having a continuously undulating internal surface defining a plurality of internal grooves; and
   a plurality of clutches, each of said plurality of clutches being uniquely associated with one of said output drive shafts and one of said output gears, each of said clutches selectively coupling one of said output gears to said corresponding drive shafts, each said clutch including at least one bearing and a plunger, said plunger including a cylindrical portion having an end, a neck extending from said end, said neck narrower than said cylindrical portion, and a ramped surface extending from said neck, said plunger movable between a first position and a second position, said end engaging said at least one bearing in said first position, said ramped surface engaging said at least one bearing in said second position to move a portion of said at least one bearing into said bearing hole and into engagement with one of said internal grooves in said output gear to couple said one of said output gears to said corresponding drive shaft.

2. The transmission of claim 1 wherein said one output gear in constant engagement with the motor is a drive gear connected to the motor.

3. The transmission of claim 1 wherein each said drive shaft is concentrically disposed within one said output gear.

4. The transmission of claim 1 wherein each of said clutches includes a solenoid for selectively coupling said motor to said corresponding output drive shaft.

5. A transmission for driving one or more powered devices from a single drive motor comprising:
   an input assembly, said input assembly being in constant driving engagement with the motor; and
   one or more output assemblies, each of said output assemblies being adapted to attach to one of the powered devices; and
   a clutch assembly for selectively coupling said input assembly and said one or more output assemblies, said clutch assembly including a plunger, said plunger including a cylindrical portion having an end, a neck extending from said end, said neck narrower than said cylindrical portion, and a frustoconical surface extending from said neck, said clutch assembly including at least one bearing, said plunger actuatable between a first position and a second position, wherein in said first position said frustoconical surface forces said at least one bearing into engagement with a portion of said input assembly and a portion of one of said one or more output assemblies to couple said input assembly and said one of said one or more output assemblies, wherein in said second position said at least one bearing engages said end of said cylindrical portion.

6. The transmission of claim 5 wherein said input assembly includes a drive gear in constant driving engagement with said motor.

7. The transmission of claim 6 wherein said input assembly includes a chain of output gears, said output gears being in constant engagement with said drive gear.

8. The transmission of claim 5, wherein said one or more output assemblies each include an output shaft adapted to attach to one of the powered devices, and wherein said input assembly includes an output gear in engagement with said motor, said bearing coupling said output gear with said output shaft when said plunger is in said second position.

9. The transmission of claim 8 including a one or more bearing holes defined in said output shaft, said bearing selectively movable from a first position inside said output shaft to a second position partially through said bearing holes and engaging said output gear.

10. The transmission of claim 9 wherein said output gear includes a constantly curving internal surface, said bearing engaging said internal surface in said second position.

* * * * *

UNITED STATES PATENT AND TRADEMARK OFFICE
CERTIFICATE OF CORRECTION

PATENT NO. : 7,313,982 B2  Page 1 of 1
APPLICATION NO. : 10/891379
DATED : January 1, 2008
INVENTOR(S) : Donald W. Wisner et al.

It is certified that error appears in the above-identified patent and that said Letters Patent is hereby corrected as shown below:

Column 7, Claim 1, Line 51:
 "affanged" should be -- arranged --

Column 7, Claim 1, Line 51:
 "affange-" should be -- arrange- --

Signed and Sealed this

Sixth Day of May, 2008

JON W. DUDAS
*Director of the United States Patent and Trademark Office*